(12) United States Patent
Rüffer et al.

(10) Patent No.: US 6,189,572 B1
(45) Date of Patent: Feb. 20, 2001

(54) PRESSURE ACCUMULATOR

(75) Inventors: Manfred Rüffer, Sulzbach; Robert Mutschler, Pfungstadt, both of (DE)

(73) Assignee: Continental Teves AG & Co., OHG (DE)

(*) Notice: Under 35 U.S.C. 154(b), the term of this patent shall be extended for 0 days.

(21) Appl. No.: 09/367,368

(22) PCT Filed: Feb. 13, 1998

(86) PCT No.: PCT/EP98/00808

§ 371 Date: Jan. 13, 2000

§ 102(e) Date: Jan. 13, 2000

(87) PCT Pub. No.: WO98/37329

PCT Pub. Date: Aug. 27, 1998

(30) Foreign Application Priority Data

Feb. 19, 1997 (DE) .............................................. 197 06 427

(51) Int. Cl.[7] .................................................. F16L 55/04
(52) U.S. Cl. .................................................. 138/30; 138/31
(58) Field of Search ........................................ 138/30, 31

(56) References Cited

U.S. PATENT DOCUMENTS

| | | | |
|---|---|---|---|
| 1,950,107 | * 3/1934 | Guinn et al. | 138/30 |
| 2,365,944 | * 12/1944 | Ashton | 138/31 |
| 2,411,315 | * 11/1946 | Ashton | 138/30 |
| 2,829,669 | * 4/1958 | Luzynski | 138/30 X |
| 3,326,241 | * 6/1967 | Mercier | 138/30 |
| 3,330,902 | * 7/1967 | Nakazawa et al. | 138/30 X |
| 3,695,297 | * 10/1972 | Ferrentino | 138/30 |
| 3,862,646 | * 1/1975 | Tarsha | 138/104 |
| 5,133,387 | * 7/1992 | Pietrykowski et al. | 138/30 |
| 5,797,430 | * 8/1998 | Becke et al. | 138/30 |
| 6,003,555 | * 12/1999 | Sheng | 138/30 X |
| 6,056,013 | * 5/2000 | Sasaki et al. | 138/30 |
| 6,076,557 | * 6/2000 | Carney | 138/30 |

FOREIGN PATENT DOCUMENTS

| | | |
|---|---|---|
| 15 55 581 | 6/1970 | (DE) . |
| 19 22 0710 | 11/1970 | (DE) . |
| 20 23 637 | 11/1971 | (DE) . |
| 29 10 554 | 9/1980 | (DE) . |
| 30 12 079 | 10/1981 | (DE) . |
| 42 40 065 | 6/1994 | (DE) . |
| 1 454 067 | 12/1966 | (FR) . |
| 588332 | * 5/1947 | (GB) ...................................... 138/30 |
| 57-158154 | 9/1982 | (JP) . |
| 57-160751 | 10/1982 | (JP) . |

OTHER PUBLICATIONS

Horton Kirby: "Bespoke Stepper Beats The Heat with Magnetic Field Intact", Eureka (Inc. Engineering Materials and Design). P. 9, Apr. 1, 1991, vol. 11, Issue 4.

* cited by examiner

*Primary Examiner*—Patrick Brinson
(74) *Attorney, Agent, or Firm*—Rader, Fishman & Grauer PLLC

(57) ABSTRACT

The present invention relates to a pressure fluid accumulator which includes a housing with a pressure fluid port and a body which is movably arranged in the housing and isolates at least two chambers in the pressure fluid accumulator from one another. The body is configured as a metal pleated bellows which is movable in the housing and encloses the one chamber.

8 Claims, 1 Drawing Sheet

PRESSURE ACCUMULATOR

TECHNICAL FIELD

The present invention relates generally to a pressure fluid accumulator, and more particularly to a pressure fluid accumulator for slip-controlled automotive vehicle brake systems.

BACKGROUND OF THE INVENTION

Hydraulic accumulators generally have elastomeric sealing elements. Depending on the type of construction of the pressure fluid accumulator as a piston-type accumulator (see in this respect German patent application No. 41 41 929) or as a diaphragm-type accumulator (see in this respect German patent application No. 41 31 524), in dependence on the partial pressure, the gas which is frequently under high pressure in the pressure fluid accumulator diffuses via the seal or diaphragm into the brake fluid. Therefore, the gas volume in these pressure fluid accumulators must be adapted to the diffusion which has to be expected. The use of a pressure fluid accumulator of this type in automotive vehicle brake systems necessitates in particular that the gas is allowed to escape from the brake fluid again in order to prevent malfunction of the brake.

German patent application No. 20 23 637 discloses a pressure fluid accumulator with an intake and outlet connection for a fuel-oil supply system which opens into the housing of the pressure fluid accumulator. A pump is connected to the intake which delivers into a chamber of the pressure fluid accumulator. The pump delivery is interrupted as soon as a tripping pin, connected to a pump switching device, is actuated by way of a pleated bellows which delimits the chamber.

Generic German patent application No. 19 22 070 discloses a pressure fluid accumulator with a pleated bellows which includes a valve element that keeps a fluid port, opening into the housing of the accumulator, closed when the hydraulic accumulator is not acted upon. On the end face of the valve element remote from the fluid port, there is fitted a cylinder which extends into the pleated bellows and, telescopically on a cylinder formed fast with the housing, guides the pleated bellows and the valve element concentrically to the fluid port in the housing. Thus, the exact alignment of the valve element in the housing which cooperates with the pleated bellows is effected by the telescopical arrangement of the two cylinders within the pleated bellows.

An object of the present invention is to develop a pressure fluid accumulator of the above-mentioned type by simple, low-cost and functionally reliable means and to eliminate the shortcomings referred to hereinabove with respect to the state of the art.

DETAILED DESCRIPTION OF THE PREFERRED EMBODIMENTS

Figure 1:
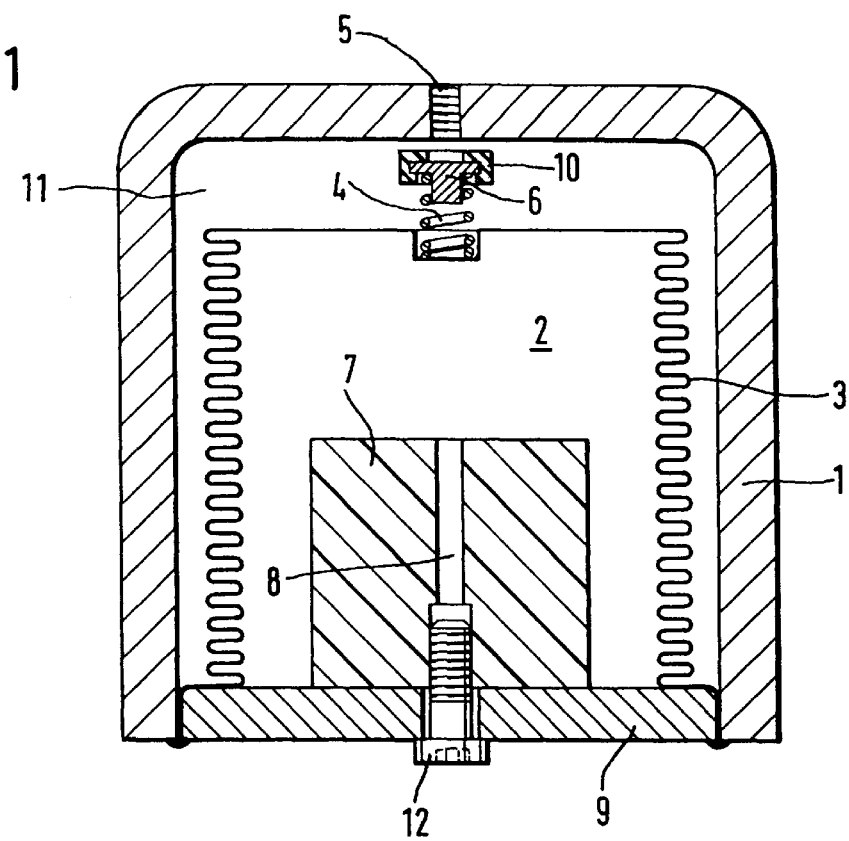
FIG. 1 is a longitudinal cross-sectional view of a favorable embodiment of the subject matter of the present invention.

The FIG. 1 embodiment is a considerably enlarged view of a pressure fluid accumulator which can be used especially for slip-controlled automotive vehicle brake systems. For this purpose, the bowl-shaped housing 1 has a pressure fluid port 5 which is adapted for connection with the brake system. According to the present invention, the pressure fluid accumulator accommodates a pleated bellows 3 attached in the housing 1 and enclosing a chamber 2 which is filled with a gas that is generally subjected to high pressure. To prevent the gas from propagating via the wall of the pleated bellows 3 out of its chamber 2 into a chamber 11 which is disposed outside the pleated bellows 3 and is in connection with the brake system by way of the pressure fluid port 5, no elastomeric structural elements were intentionally used for configuring the pleated bellows 3. Hence, exclusively metal was used to manufacture the pleated bellows 3 according to the present invention. Attached to the end surface of the bowl-shaped pleated bellows 3 is a spring element 4 which carries a valve element 6 facing the pressure fluid port 5. Besides, an inner body 7 which is preferably made of plastics is placed inside the pleated bellows 3. The dimensioning of body 7 determines the pressure take-up characteristics of the pressure fluid accumulator and, additionally, can be used as a stop for the end surface of the pleated bellows 3. The pleated bellows 3 with its open end area is compressed between the bowl-shaped housing 1 and the closing element 9 configured as a cover and also sealed in between. A channel-shaped supply connection 8 extends through the cover-shaped closing element 9 and opens into the chamber 2 enclosed by the pleated bellows 3, preferably through the inner body 7 which characterizes the accumulator behavior. According to the drawing, the supply connection 8 provided for the gas is closed by a sealing screw 12 which simultaneously extends in part through the cylindrical inner body 7 on the cover-shaped closing element 9. Both the housing 1 and the pleated bellows 3 are preferably deepdrawn in the bowl-type configuration shown in the drawing. The peripheral surface of the pleated bellows 3, includes a wave contour which forms the bellows.. The bellows are formed preferably by using compression molding techniques. The valve element 6 fastened to the spring element 4 preferably includes a vulcanized sealing element 10. This provides a particularly simple and reliable sealing of the chamber 11 in relation to the pressure fluid port 5 in the housing 1.

The closing element 9 connects the housing 1 and the pleated bellows 3 to a stable and easy-to-make unit.

The bowl-shaped housing 1, which is preferably made as a deepdrawn part, can be provided with a connecting thread (inside or outside thread) relatively easily in the area of the pressure fluid port 5 which is disposed on the bowl bottom. Thus, the pressure fluid accumulator is also appropriate as a screw-in or screw-on type accumulator for the system connected.

Supply connection 8, especially in the embodiment shown, is a standard or series part in view of its construction.

The valve element 6 configured as a seat valve has a flat seat so that the need for accurate centering with respect to the pressure fluid port 5 is eliminated. The possibly vulcanized sealing element 10 ensures a favorable increasing sealing effect at elevated contact pressures of the valve element 6 on the housing bore of the pressure fluid port 5.

The spring element 4 expediently ensures uncoupling of the pleated bellows 3 from the pressure fluid port 5, with the result that possible concentricity tolerances of the pleated bellows 3 can be compensated and tolerated. Further, the spring element 4 achieves a safety finction for the valve element 6 inasmuch as the pleated bellows 3, due to pressure fluid leakage in the chamber 11, can expand until the valve element 6 and the pleated bellows 3 act directly on each other due to the compressed spring element 4. Safe closing of the valve element 6 is achieved, corresponding to the inside gas pressure in the chamber 2, due to the surface transmission ratio of the bellows cross-section in relation to the outlet cross-section on the pressure fluid port 5. This prevents further pressure fluid leakage.

Due to the maximum permissible and thus limited excess pressure in the pressure fluid accumulator, it must be safeguarded for the construction of the pleated bellows 3 that the fluid pressure in the chamber 11 is always higher than the gas pressure in the chamber 2 in order that outside the pleated bellows 3 the permissible excess pressure is preserved. Because the maximum permissible external excess pressure for a one-layer pleated bellows amounts to 40 bar approximately, the pressure fluid accumulator is simultaneously filled with gas via the supply connection 8 and with pressure fluid or brake fluid via the pressure fluid port 5. This produces the bottom pressure working point A illustrated in the diagram of FIG. 2.

The valve element 6 closes the pressure fluid port 5 at a gas pressure in the pleated bellows 3 which slightly exceeds the atmospheric excess pressure. The greater the decline in the pressure of the brake fluid in the chamber 11 or on the pressure fluid port 5 of the brake system is, the more potential is the sealing effect of the valve element 6 on the valve seat (pressure fluid port 5) due to the increased surface pressure.

Figure 2:
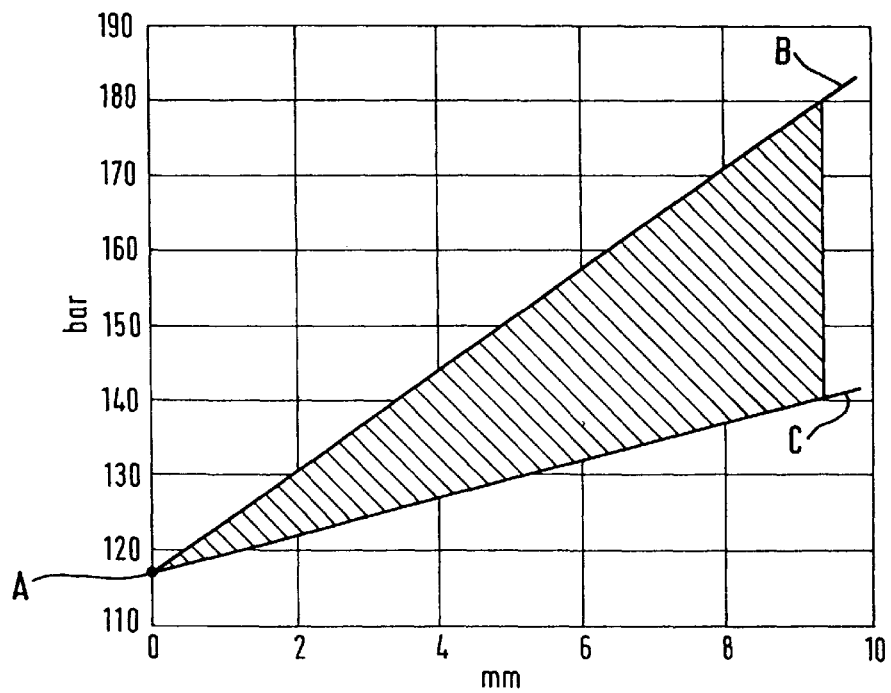
FIG. 2 is a view showing the course of the characteristic curve of the subject matter of the present invention.

The diagram of FIG. 2 illustrates the characteristic curve variation as a function of the pressure variation in the pressure accumulator plotted against the spring travel of the pleated bellows 3. The top characteristic curve B corresponds to the pressure variation of the brake fluid, and the bottom characteristic curve C indicates the pressure variation of the gas as a function of the spring travel of the pleated bellows 3. Corresponding to the criterion of dimensioning, the above-mentioned excess pressure is thus achieved as a permissible differential pressure of 40 bar for the respective pressure fluid accumulator, with the maximum stroke of the pleated bellows.

When desired or required, gas filling of the pleated bellows 3 can be eliminated. The spring rate of the metal bellows and its rigidity will then permit the representation of a so-called medium pressure accumulator instead of the high-pressure accumulator illustrated in the diagram of FIG. 2. When the subject matter of the present invention is employed as a medium pressure accumulator, the supply connection 8, the inner body 7, the valve element 6, and the spring element 5 may be omitted.

Irrespective of whether the subject matter of the present invention is used as a high-pressure accumulator or medium pressure accumulator, technical advantages are achieved for the subject matter of the present invention which include, in particular, the absolute gas-tightness, low maintenance, and adaptation of the accumulator behavior to different pressure working points by means of the inner body 7. Further advantages can be seen in the wear-free operation and simple construction. Extremely great safety reserves are achieved especially due to an extremely high bursting limit of the pleated bellows 3 which amounts to approximately ten times the permissible excess pressure. Besides, it is worth mentioning the advantages in terms of production technique which render precision parts and finished surfaces unnecessary. In addition, the pleated bellows 3 can be sealed between the housing 1 and the cover-shaped closing element 9 by way of a welding seam in conformity with the demands of automation.

What is claimed is:

1. Pressure fluid accumulator for slip-controlled automotive vehicle brake systems, comprising:

a housing including a pressure fluid port, a valve element which opens and closes the pressure fluid port, a body which is movably arranged in the housing and isolates at least two chambers in the pressure fluid accumulator from one another, wherein the body is configured as a pleated bellows which is movable in the housing and encloses the one chamber, and the chamber enclosed by the pleated bellows is filled with a gas, wherein a spring element is attached to the end surface of the pleated bellows and carries the valve element which faces the pressure fluid port, wherein the spring element is compressed by the pleated bellows, and the pressure fluid port is closed by the valve element when the pressure of a fluid which is applied to the chamber by way of the pressure fluid port is lower than the pressure of the gas in the chamber enclosed by the pleated bellows, wherein the valve element has an increasing surface pressure on the pressure fluid port which enhances the sealing effect of the valve element, with decreasing pressure of the fluid in the chamber connected to the pressure fluid port.

2. Pressure fluid accumulator as claimed in claim 1, wherein the pleated bellows is made of a metal.

3. Pressure fluid accumulator as claimed in claim 1, further including an inner body which is preferably made of plastic is positioned in the pleated bellows.

4. Pressure fluid accumulator as claimed in claim 1, wherein the pleated bellows accommodates a supply connection which opens into the one chamber enclosed by the pleated bellows, preferably through an inner body which characterizes the accumulator behavior.

5. Pressure fluid accumulator as claimed in claim 1, wherein the pleated bellows with its open end area is attached and sealed between the housing and the closing element configured as a cover.

6. Pressure fluid accumulator as claimed in claim 1, wherein the housing is a deepdrawn part.

7. Pressure fluid accumulator as claimed in claim 1, wherein the valve element acts as a seat valve which includes a sealing element.

8. Pressure fluid accumulator as claimed in claim 1, wherein the pleated bellows is configured as a bowl in a deepdrawing process, and the peripheral surface of the bowl has been provided with the wave contour of a pleated bellows in a compression molding process.

* * * * *